United States Patent
Kim et al.

(10) Patent No.: US 8,285,129 B2
(45) Date of Patent: Oct. 9, 2012

(54) HOT WATER SUPPLY SYSTEM FOR CONSTANTLY MAINTAINING TEMPERATURE OF HOT WATER

(75) Inventors: Yong-Bum Kim, Incheon (KR); Si-Hwan Kim, Incheon (KR)

(73) Assignee: Kyungdong One Corporation, Seoul (KR)

( * ) Notice: Subject to any disclaimer, the term of this patent is extended or adjusted under 35 U.S.C. 154(b) by 491 days.

(21) Appl. No.: 12/519,155

(22) PCT Filed: Dec. 26, 2008

(86) PCT No.: PCT/KR2008/007708
§ 371 (c)(1),
(2), (4) Date: Jun. 12, 2009

(87) PCT Pub. No.: WO2009/157629
PCT Pub. Date: Dec. 30, 2009

(65) Prior Publication Data
US 2010/0329650 A1    Dec. 30, 2010

(30) Foreign Application Priority Data
Jun. 24, 2008   (KR) ................. 10-2008-0059493

(51) Int. Cl.
*F24H 1/18* (2006.01)
(52) U.S. Cl. .............. 392/449; 392/461; 392/463
(58) Field of Classification Search .............. None
See application file for complete search history.

(56) References Cited

U.S. PATENT DOCUMENTS
3,608,818 A * 9/1971 Von Fellenberg ........... 237/8 B
(Continued)

FOREIGN PATENT DOCUMENTS
JP            06-109263           4/1994
(Continued)

OTHER PUBLICATIONS
International Search Report of International Application No. PCT/KR2008/007708 mailed Aug. 12, 2009.
(Continued)

*Primary Examiner* — Thor Campbell
(74) *Attorney, Agent, or Firm* — Hershkovitz & Associates, LLC; Abraham Hershkovitz

(57) ABSTRACT

In a hot water supply system, a heat exchanger transfers heat from a heating device to inflow water to supply the inflow water at a user-set temperature. A flow sensor measures a flow rate of inflow water. A water tank stores outflow water discharged from the heat exchanger. A first temperature sensor, installed on an inlet pipe through which the inflow water flows, measures a temperature of the inflow water. A second temperature sensor, installed on an outlet pipe through which the outflow water flows, measures a temperature of the outflow water discharged from the heat exchanger. A controller includes an input unit to receive input from a user, wherein the controller controls an operation of the heating device based on at least one of: (1) comparison between the user-set temperature and the temperature of the outflow water; (2) variation in the flow rate; or (3) any combination thereof.

13 Claims, 6 Drawing Sheets

U.S. PATENT DOCUMENTS

| | | | | |
|---|---|---|---|---|
| 4,623,093 | A | * | 11/1986 | Arndt ............................ 237/19 |
| 5,988,118 | A | * | 11/1999 | Park .......................... 122/406.1 |
| 6,370,896 | B1 | * | 4/2002 | Sakakibara et al. ............ 62/201 |
| 6,494,051 | B2 | * | 12/2002 | Sakakibara et al. ............ 62/225 |
| 6,622,930 | B2 | * | 9/2003 | Laing et al. .................... 237/80 |
| 7,021,073 | B2 | * | 4/2006 | Sakakibara .................. 62/238.7 |
| 7,322,532 | B2 | * | 1/2008 | Takada et al. .................. 236/11 |
| 7,856,835 | B2 | * | 12/2010 | Ida ................................. 62/150 |
| 2002/0014085 | A1 | * | 2/2002 | Sakakibara et al. ............ 62/201 |
| 2009/0113911 | A1 | * | 5/2009 | Nakayama .................. 62/238.6 |
| 2009/0222111 | A1 | * | 9/2009 | Matsuoka et al. .............. 700/78 |
| 2009/0250203 | A1 | * | 10/2009 | Ida ............................... 165/287 |
| 2010/0212604 | A1 | * | 8/2010 | Kim et al. ...................... 122/32 |

FOREIGN PATENT DOCUMENTS

| | | |
|---|---|---|
| JP | 07-127873 | 5/1995 |
| KR | 10-0812937 | 3/2008 |
| KR | 10-0812937 B1 | 3/2008 |
| RU | 2282792 C2 | 8/2006 |

OTHER PUBLICATIONS

English abstract of Publication No. JP 06-109263.
English abstract of Publication No. JP 07-127873.
English abstract of Publication No. KR 10-0812937.
Russian Office Action mailed Dec. 12, 2011.

* cited by examiner

FIG. 1 - PRIOR ART
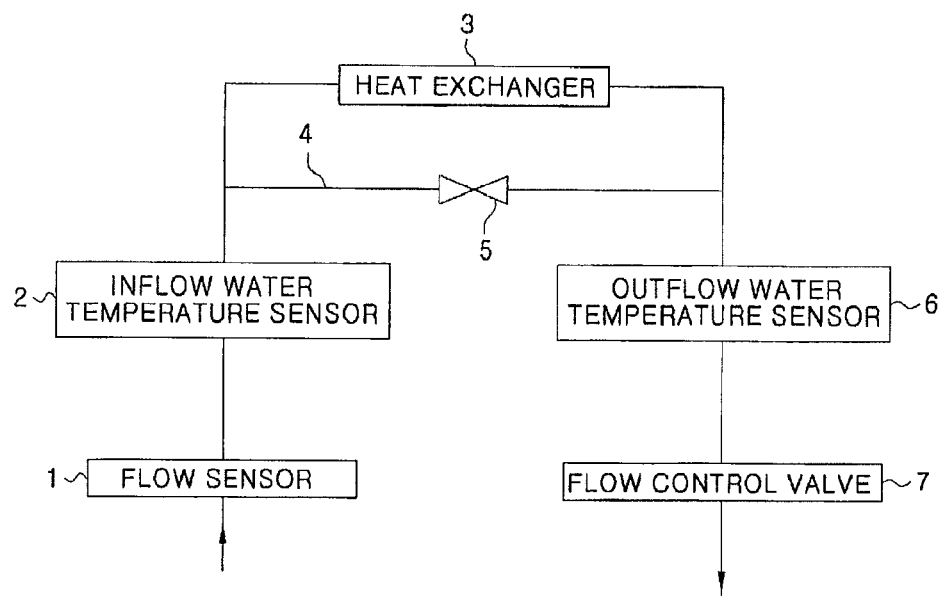
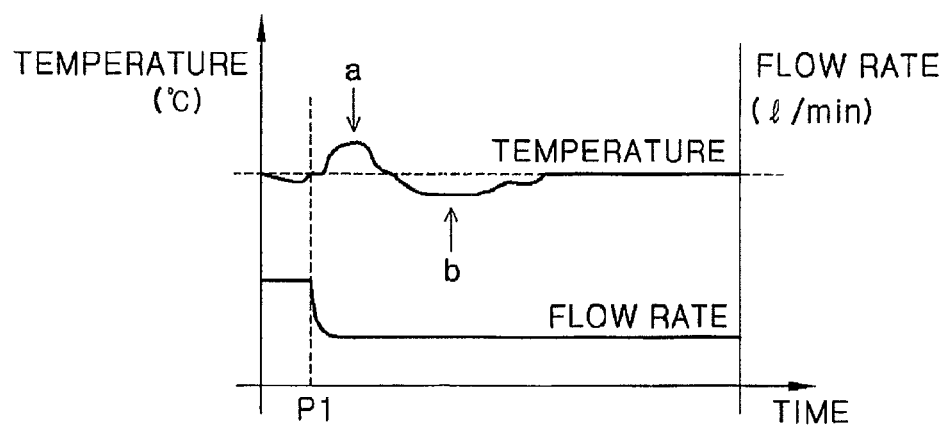
FIG. 2 - PRIOR ART

FIG. 3 - PRIOR ART
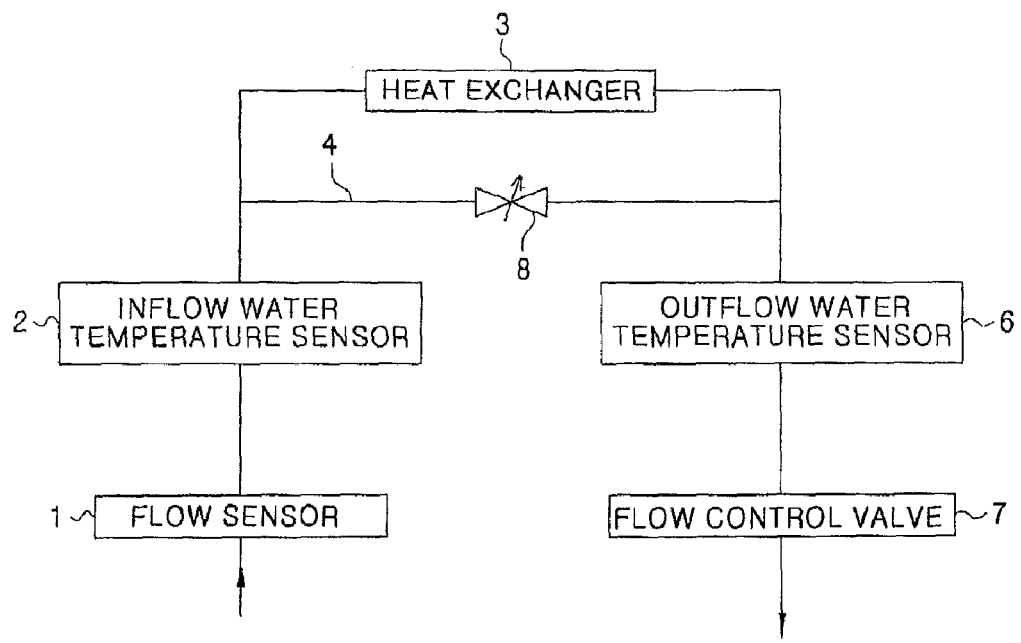
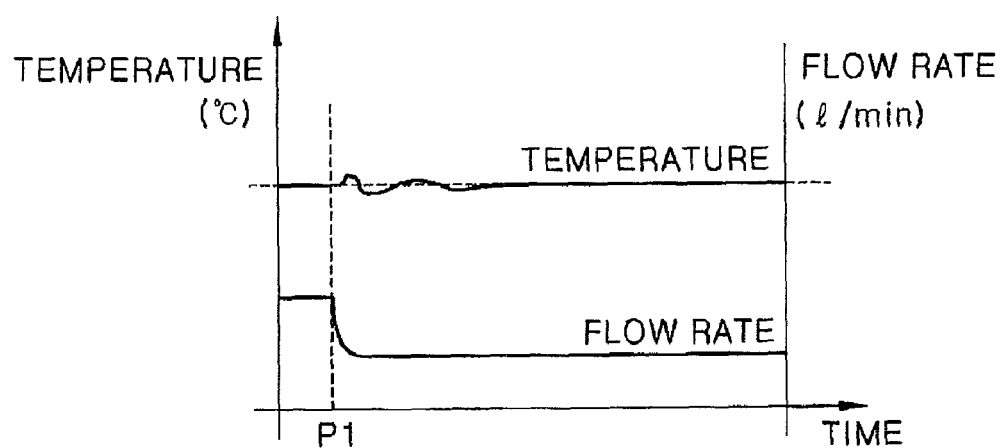
FIG. 4 - PRIOR ART

FIG. 5
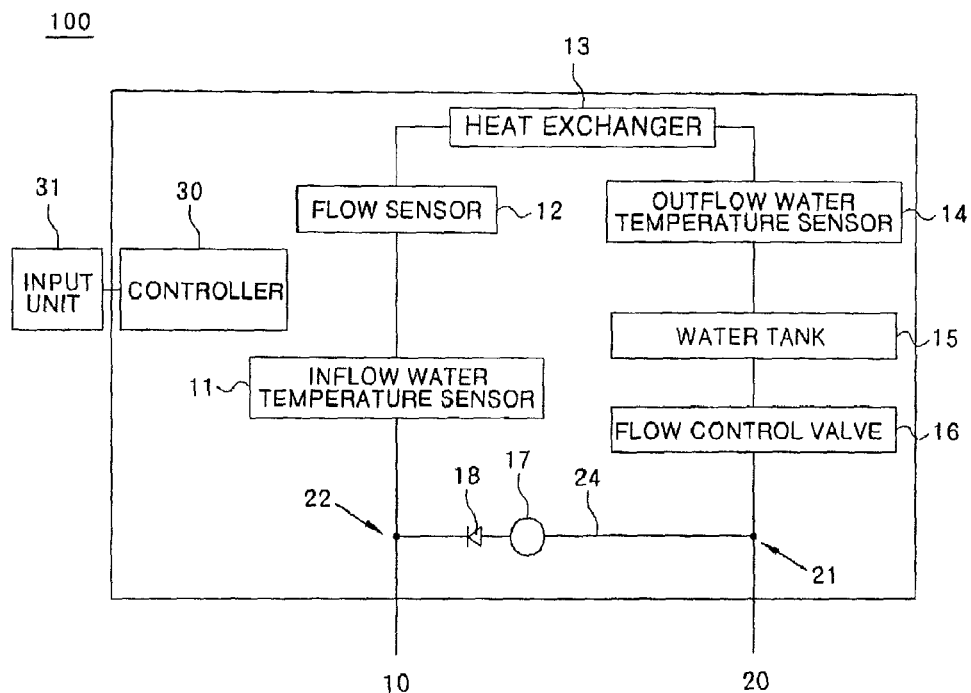
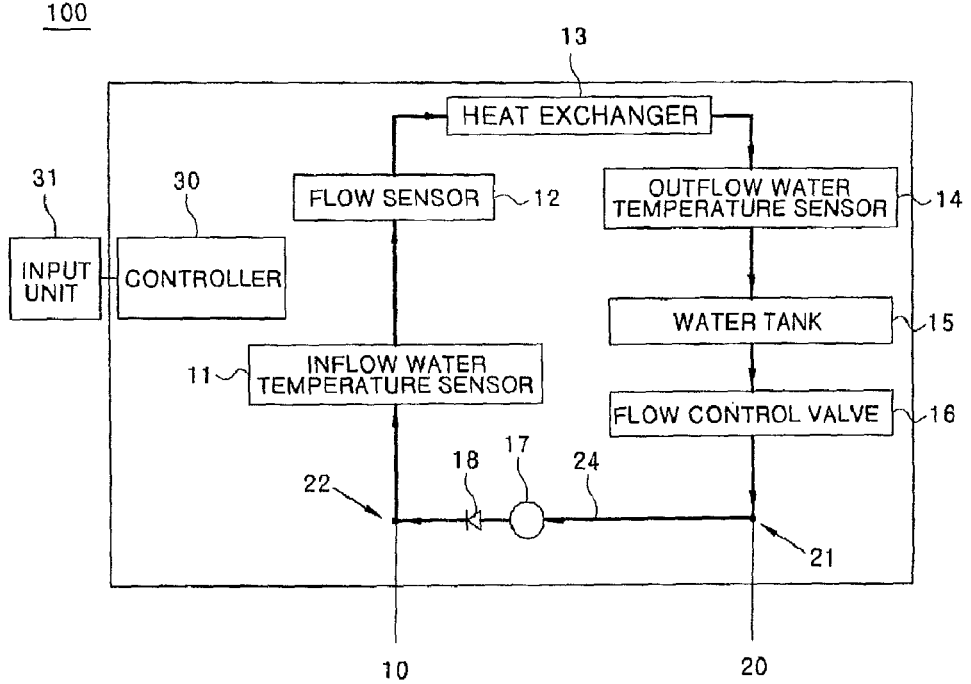
FIG. 6

FIG. 7
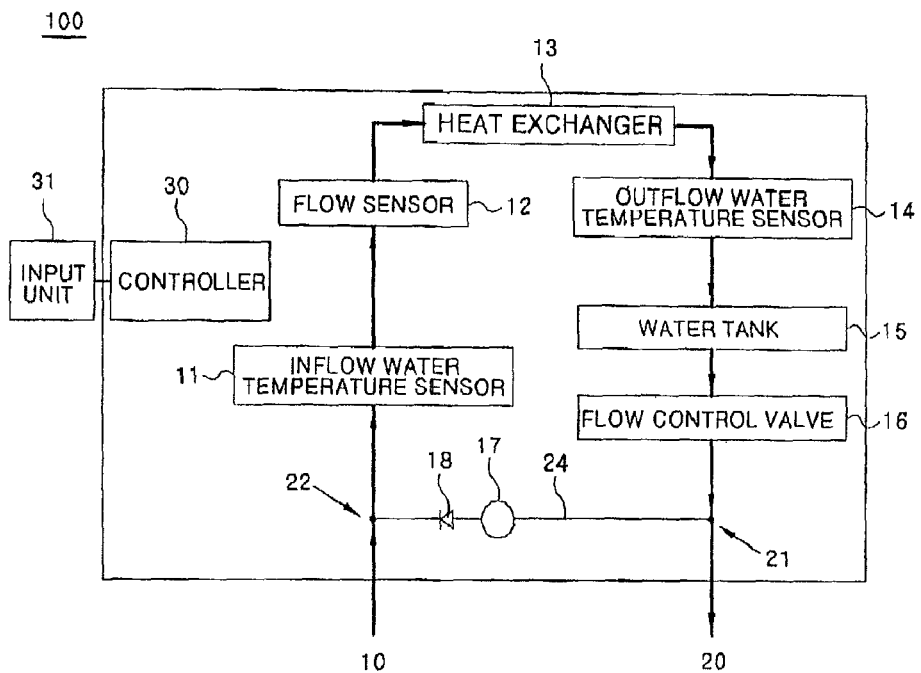
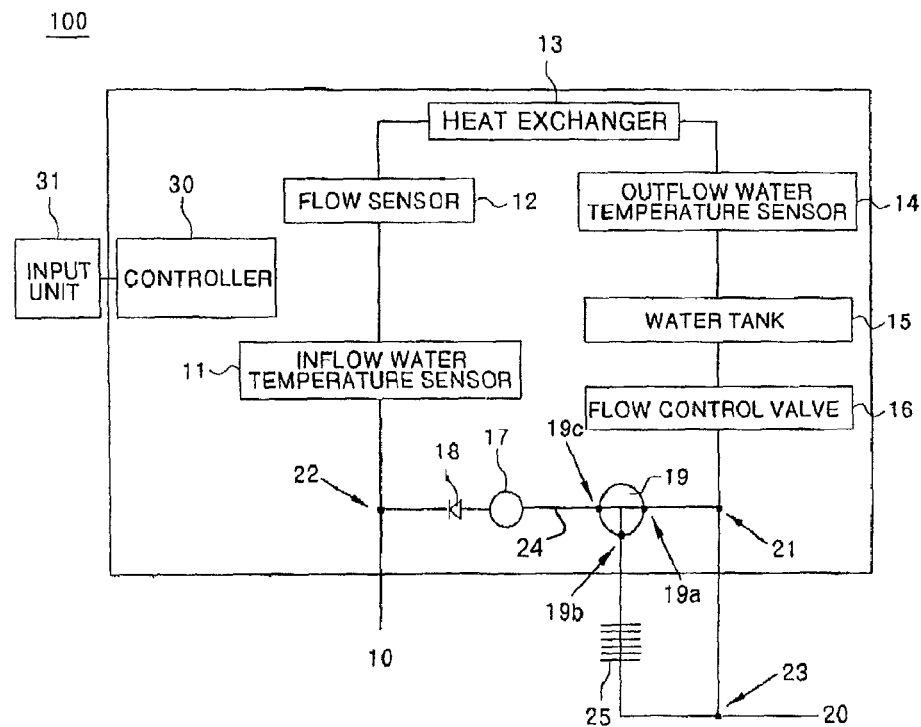
FIG. 8

FIG. 9
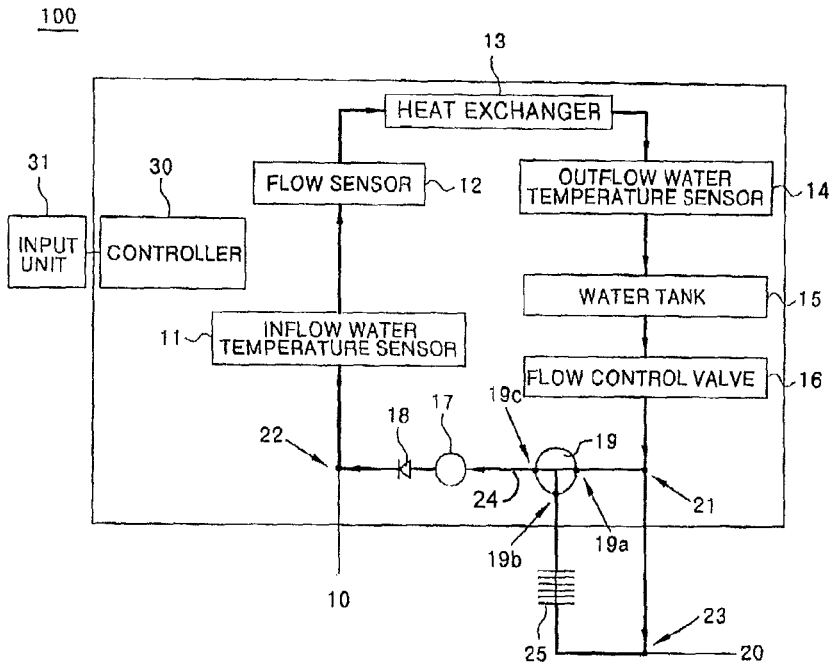
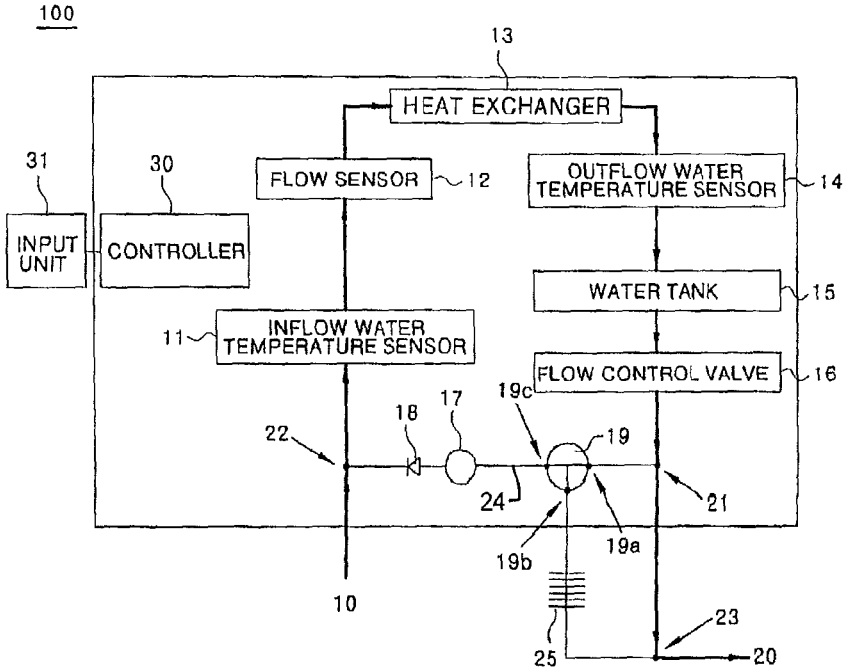
FIG. 10

FIG. 11
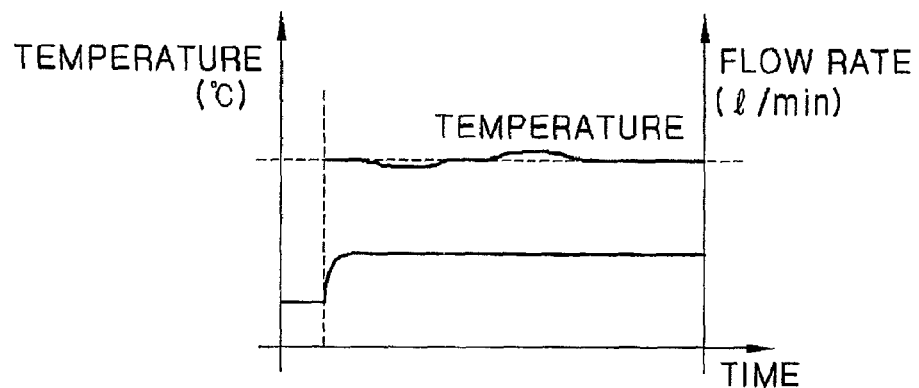
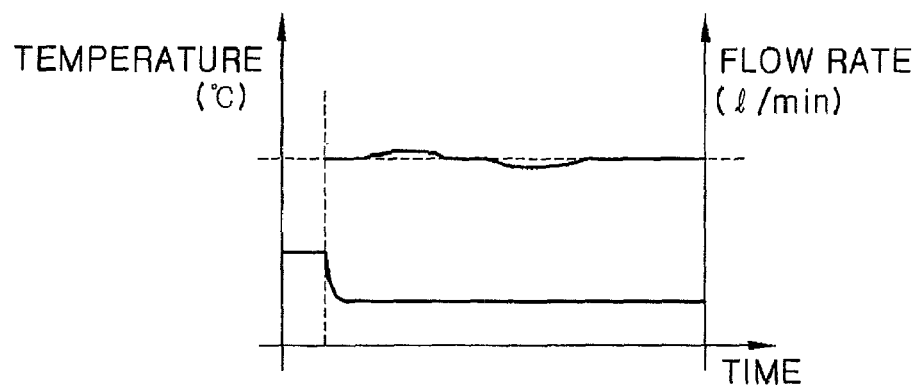
FIG. 12

HOT WATER SUPPLY SYSTEM FOR CONSTANTLY MAINTAINING TEMPERATURE OF HOT WATER

CROSS-REFERENCE TO RELATED APPLICATIONS

The present application is a national stage application under 35 U.S.C. §371 of International Application No. PCT/KR2008/007708 with an international filing date of Dec. 26, 2008, and claims priority to KR10-2008-0059493 filed Jun. 24, 2008.

BACKGROUND OF THE INVENTION

1. Field of the Invention

The present invention relates to a hot water supply system for maintaining a constant temperature of hot water, and more particularly, a hot water supply system for maintaining a constant temperature of hot water that enhances an overshoot and an undershoot of the temperature of the hot water which temporarily occur depending on variation of usage of the hot water.

2. Description of the Related Art

In general, a hot water supply system (hereinafter, referred to as "water heater") is used for heating and supplying water at a predetermined temperature within a short time. A performance of the water heater is primarily determined depending on how rapidly a temperature of hot water reaches a user-set temperature, and whether hot water maintaining the user-set temperature can be supplied even if usage of the hot water varies.

FIG. 1 is a diagram illustrating a configuration of a known water heater having a by-pass valve 5, and FIG. 2 is a graph illustrating a change in temperature of hot water depending on a decrease in usage of hot water in the water heater. FIG. 3 is a diagram illustrating a configuration of a known hot water supply system having a mixing valve 8, and FIG. 4 is a graph illustrating a change of a temperature of hot water depending on a decrease of usage of the hot water in the system shown in FIG. 3.

The water heater shown in FIG. 1 includes a flow sensor 1 that senses a flow rate of inflow water, an inflow water temperature sensor 2 that measures a temperature of the inflow water, a heat exchanger 3 that transfers heat from a heating device (burner) to the inflow water, a by-pass pipe 4 that directly connects an inflow pipe and an outflow pipe with each other, a by-pass valve 5 for supplying the inflow water directly to the outflow pipe through the by-pass pipe 4 without passing through the heat exchanger 3, an outflow water temperature sensor 6 that measures a temperature of hot water in the outflow pipe, and a flow control valve 7 that controls an amount of the hot water flowing in the outflow pipe.

When a user, while using the hot water, decreases the usage of the hot water from a large flow rate to a small flow rate at a time P1 in the graph of FIG. 2, a controller (not shown) senses the decrease of the flow rate through the flow sensor 1 to reduce a heating power of the burner. However, as hot water of the large flow rate has already been supplied to the heat exchanger 3 before the usage of the hot water is decreased, a large amount of heat has already been supplied to the inside of the heat exchanger 3. As a result, in this state, even though the flow rate passing through the heat exchanger is decreased to thereby reduce the heating power of the burner, hot water having a temperature higher than a set temperature temporarily flows out.

In order to decrease the time period during which the hot water having the temperature higher than the set temperature flows out (hereinafter referred to as "overshoot"), the controller rapidly reduces the heating power of the burner for a predetermined time. Therefore, as shown in the graph of FIG. 2, following the period during which the hot water having the temperature higher than the user set temperature temporarily flows out (see arrow a), hot water having a temperature lower than the user set temperature flows out for a predetermined time (hereinafter referred to as "undershoot") (see arrow b).

As such, in order to prevent an outflow temperature from being temporarily increased when the user changes the hot water to a small flow rate from a large flow rate, the by-pass valve 5 that is closed in normal times is opened, such that inflow water is sent directly to the outflow pipe without passing through the heat exchanger 3 when the overshoot occurs due to the rapid decrease in the flow rate. The low-temperature water sent to the outflow pipe through the by-pass valve 5 is mixed with the overshot high-temperature water to thereby alleviate the overshoot of the outflow temperature.

However, such a water heater having the by-pass valve 5 is disadvantageous, in that it cannot alleviate the undershoot in a case where the user changes to the large flow rate of hot water from the small flow rate of hot.

In order to solve the above-mentioned problem, as shown in FIG. 3, a water heater having a flow controllable mixing valve 8 has been developed instead of the known by-pass valve 5.

The water heater shown in FIG. 3 allows a small amount of inflow water to flow to the outflow pipe without passing through the heat exchanger 3 by slightly opening the mixing valve 8 even in normal times. Accordingly, because the low-temperature water which does not pass through the heat exchanger 3 flows into the outflow pipe and is mixed with the water passing through the heat exchanger 3, a control temperature of the heat exchanger 3 is set to a temperature higher than the user-set temperature. Therefore, the water passing through the mixing valve 8 is mixed with the water passing through the heat exchanger 3, such that a temperature of the hot water in the outflow pipe reaches the user-set temperature.

For example, when the usage of the hot water is rapidly decreased at a time P1 shown in the graph of FIG. 4, the controller increases the amount of the water supplied directly to the outflow pipe through the by-pass pipe 4 by further opening the mixing valve 8 to thereby alleviate a temporary overshoot. Meanwhile, when the undershoot occurs due to a rapid increase in the usage of the hot water, the controller decreases the amount of the water supplied directly to the outflow pipe through the by-pass pipe 4 without passing through the heat exchanger by further closing the mixing valve 8. Thus, the set temperature is achieved by relatively increasing the amount of the water that flows out from the outflow pipe through the heat exchanger 3.

Accordingly, when the mixing valve described above is used, a sudden change in the temperature of hot water due to a variation in the usage of the hot water can be prevented, and hot water having a temperature approximately the set temperature can be obtained. As shown in the graph of FIG. 4, the overshoot and the undershoot of the hot water temperature which occur due to the decrease in the usage of the hot water are considerably reduced in comparison with the case shown in the graph of FIG. 2.

As described above, although the water heater shown in FIG. 1 can enhance the temporary overshoot of the temperature of the hot water which occurs due to the decrease of the usage of the hot water, the water heater is disadvantageous, in that it cannot effectively deal with the undershoot when the usage of the hot water is increased.

In contrast, the water heater shown in FIG. 3 can deal with both temporary overshoot and undershoot of the temperature of the hot water according to the variation of the usage of the hot water. However, such a water heater has a problem, in that a temperature at an outlet of the heat exchanger is controlled to be higher than the user-set temperature by approximately 20° C. on the average in order to improve controlling the temperature of the hot water depending on the variation of the flow rate of the hot water. Therefore, efficiency of the water heater is decreased.

Further, a condensing water heater recovers energy, which is released when exhaust gas is condensed, and utilizes the energy for heating the hot water. In this case, when the outlet temperature of the heat exchanger is controlled to be high, the hot water outlet temperature is higher than a condensing temperature of the exhaust gas, which is approximately 55° C. or less, such that it is difficult for the exhaust gas to become condensed. Therefore, the energy of the condensed exhaust gas cannot be recovered, thereby decreasing the efficiency of the water heater.

Further, depending on a quality of the water in use, when the water contains lime, most of the lime is extracted at approximately 55° C. or more. In the case of the water heater shown in FIG. 3, assuming that a hot water set temperature is approximately 50° C., which is a temperature generally set by the user, the heat exchanger controls the hot water set temperature to be 70° C., higher than 50° C. by approximately 20° C., so as to control the hot water outlet temperature. When water which flows into the user's inflow pipe contains lime, the lime is extracted in the heat exchanger, such that the efficiency of the water heater is deteriorated after a long period of use, and heat transfer is decreased in the heat exchanger, such that partial boiling may occur, such that durability of the water heater is decreased.

SUMMARY OF THE INVENTION

Accordingly, it is a first object of the present invention to provide a hot water supply system for maintaining a constant temperature of hot water that enhances an overshoot and an undershoot of the temperature of the hot water, which temporarily occur depending on variation in the usage of the hot water, while maximally maintaining efficiency of a water heater.

Further, it is a second object of the present invention to provide a hot water supply system for maintaining a constant temperature of hot water, which, in the case of a condensing water heater, controls a temperature at an outlet of a heat exchanger to be a condensing temperature of exhaust gas or less, so as to recover energy which is released when the exhaust gas is condensed, thereby improving.

In addition, it is a third object of the present invention to provide a hot water supply system for maintaining a constant temperature of hot water, which, in case an inflow water contains a lime component, prevents the lime in the hot water from being extracted when the hot water passes through a heat exchanger by controlling an internal temperature of the heat exchanger to be lower than a lime extraction temperature.

According to one aspect of the present invention, a hot water supply system is provided for heating water which includes: a heat exchanger configured to transfer heat from a heating device to an inflow water so as to supply the outlet water at a user-set temperature; a flow sensor configured to measure a flow rate of the inflow water; a water tank configured to store an outflow water discharged from the heat exchanger; a first temperature sensor configured to measure a temperature of the inflow water, the first temperature sensor being installed at a predetermined position on an inlet pipe through which the inflow water flows; a second temperature sensor configured to measure a temperature of the water discharged from the heat exchanger, the second temperature sensor being installed at a predetermined position on an outlet pipe through which the outflow water flows; and a controller including an input unit configured to receive an input from a user, wherein the controller controls an operation of the heating device based on at least one of: (1) comparison between the user-set temperature and the temperature of the outflow water; (2) variation in the flow rate; or (3) any combination thereof.

Further, the hot water supply system includes a pump that is installed on a first pipe connecting the inlet pipe and the outlet pipe; a first diverging point defined by a position where the first pipe and the outlet pipe are connected; and a second diverging point defined by a position where the first pipe and the inlet pipe are connected, wherein the controller has a preheating circulation mode in which, when the user does not use hot water, a preheated water is circulated by the pump through an internal circulation path based on a preheating circulation temperature, the internal circulation path including the first pipe, the first diverging point, the second diverging point and the heat exchanger.

Further, the preheating circulation temperature includes a preheating circulation-on temperature and a preheating circulation-off temperature, and the controller controls the heating device to start when the temperature of the outflow water is lower than the preheating circulation-on temperature, which is lower than the user-set temperature, and to stop when the temperature of the outflow water is equal to or higher than the preheating circulation-off temperature, which is equal to or higher than the user-set temperature.

Further, the controller controls the preheating circulation mode in response to a time frame inputted by the user.

Further, the hot water supply system further includes a check valve positioned on the first pipe between the pump and the second diverging point.

Further, the hot water supply system further includes a second pipe connecting the first pipe and the outlet pipe; a third diverging point defined by a position where the second pipe and the outlet pipe are connected, the third diverging point being positioned between the first diverging point and the outlet; a 3-way valve configured to connect the first and second pipes, the 3-way valve being positioned between the first diverging point and the pump; and a radiator positioned on the second pipe, wherein preheated water in the preheating circulation mode passes through the third diverging point, the radiator and the 3-way valve.

According to another aspect of the present invention, provided is a hot water supply system having a preheating circulation mode to preheat water, which includes: a first diverging point defined by a position where a first pipe and an outlet pipe are connected; a second diverging point defined by a position where the first pipe and an inlet pipe are connected; a pump positioned on the first pipe between the first diverging point and the second diverging point; and a heat exchanger configured to transfer heat from a heating device to an inflow water to supply an outlet water at a user-set temperature, wherein, when a user does not use hot water, the outlet pipe is closed and the preheating circulation mode is performed in which the hot water circulates in an internal circulation path by a pressure of the pump, the internal circulation path including the first pipe, the first diverging point, the second diverging point and the heat exchanger.

Further, the hot water supply system includes a water tank configured to store an outflow water discharged from the heat exchanger.

Further, the heating device is controlled to start when a temperature of an outflow water discharged from the heat exchanger is lower than a preheating circulation-on temperature, which is lower than the user-set temperature, and to stop when the temperature of the outflow water discharged from the heat exchanger is equal to or higher than a preheating circulation-off temperature, which is equal to or higher than the user-set temperature.

According to still another aspect of the present invention, a hot water supply system is provided for heating water, which includes: a heat exchanger configured to transmit heat from a heating device to an inflow water to supply an outlet water discharged from the heat exchanger at a user set temperature; a flow sensor configured to measure a flow rate of the inflow water; a water tank configured to store an outflow water discharged from the heat exchanger; a first temperature sensor configured to measure a temperature of the inflow water, the first temperature sensor being installed at a predetermined position on an inlet pipe through which the inflow water flows; a second temperature sensor configured to measure a temperature of the outflow water, the second temperature sensor being installed at a predetermined position on an outlet pipe through which the outflow water flows; a controller including an input unit configured to receive an input from a user, a pump that is installed on a first pipe connecting the inlet pipe and the outlet pipe; a first diverging point defined by a position where the first pipe and the outlet pipe are connected; a second diverging point defined by a position where the first pipe and the inlet pipe are connected; a second pipe connecting the first pipe and the outlet pipe; a third diverging point defined by a position where the second pipe and the outlet pipe are connected, the third diverging point being positioned between the second diverging point and the outlet; a 3-way valve configured to connect the first and second pipes, the 3-way valve being positioned between the first diverging point and the pump; a radiator positioned on the second pipe; and a check valve positioned on the first pipe between the pump and the second diverging point, wherein the controller controls an operation of the heating device based on at least one of: (1) comparison between the user set temperature and the temperature of the outflow water; (2) variation in the flow rate; or (3) any combination thereof, wherein the controller has a preheating circulation mode in which a preheated water is circulated by the pump through an internal circulating path based on a preheating circulation temperature, the internal circulation path including the first diverging point, the second diverging point, the third diverging point, the second pipe, the exchanger and the 3-way valve, and wherein the preheating circulation temperature includes a preheating circulation-on temperature and a preheating circulation-off temperature, and the controller controls the heating device to start when the temperature of the outflow water is lower than the preheating circulation-on temperature, which is lower than the user-set temperature, and to stop when the temperature of the outflow water is equal to or higher than the preheating circulation-off temperature, which is equal to or higher than the user-set temperature, and wherein the controller controls the preheating circulation mode in response to a time frame inputted by the user.

According to the present invention, when the usage of the hot water is changed, a temporary change of the temperature of the hot water can be absorbed by a water tank, such that the hot water can be used without having a rapid change in the temperature of the hot water. Further, in the case of a condensing water heater, since an outlet temperature of the heat exchanger is controlled to be a condensing temperature of exhaust gas or less, efficiency of the water heater is increased. Still further, an internal temperature of the heat exchanger can be controlled to be lower than a temperature at which lime is extracted, such that it is possible to prevent durability of the heat exchanger from being decreased.

Further, a water tank for storing a predetermined amount of water is installed in the water heater, and the water stored in the water tank and water residing in a pipe are preheated and circulated even in a state in which the hot water is not used, such that it is possible to supply the hot water at the set temperature within a short time when a user wants to use the hot water, and prevent freezing of the pipe due to a decrease of an ambient temperature during the winter season.

Still further, during the preheating circulation process, a flow path of the hot water can be controlled such that the hot water passes through an outside radiator by manually or automatically operating a 3-way valve, thereby preheating the water residing in the water heater by using only one internal pump, and utilizing the hot water supply system as a heating device.

BRIEF DESCRIPTION OF THE DRAWINGS

FIG. 1 is a diagram illustrating a configuration of a known hot water supply system having a by-pass valve;

FIG. 2 is a graph illustrating a change of a temperature of hot water depending on a decrease of usage of the hot water in the system shown in FIG. 1;

FIG. 3 is a diagram illustrating a configuration of a known hot water supply system having a mixing valve;

FIG. 4 is a graph illustrating a change of a temperature of hot water depending on a decrease of usage of the hot water in the system shown in FIG. 3;

FIG. 5 is a diagram illustrating a configuration of a hot water supply system according to a first embodiment of the present invention;

FIG. 6 is a diagram illustrating a flow path of water while preheating in the hot water supply system shown in FIG. 5;

FIG. 7 is a diagram illustrating a flow path of water while using hot water in the hot water supply system shown in FIG. 5;

FIG. 8 is a diagram illustrating a configuration of a hot water supply system according to a second embodiment of the present invention;

FIG. 9 is a diagram illustrating a flow path of water while preheating in the hot water supply system shown in FIG. 8;

FIG. 10 is a diagram illustrating a flow path of water while using hot water in the hot water supply system shown in FIG. 8;

FIG. 11 is a graph illustrating a change of a temperature of hot water depending on an increase of usage of the hot water in a hot water supply system according to the present invention; and FIG. 12 is a graph illustrating a change of a temperature of hot water depending on a decrease of usage of the hot water in a hot water supply system according to the present invention.

DESCRIPTION OF PREFERRED EMBODIMENTS

The configuration and operation of preferred embodiments of the present invention will be hereinafter described in detail with reference to the accompanying drawings. Giving reference numerals to components in the drawings herein, it is noted that the same components are designated by substantially the same reference numerals, even though they are shown in different drawings.

FIG. 5 is a diagram illustrating a configuration of a water heater according to a first embodiment of the present invention. FIG. 6 is a diagram illustrating a flow path of water while preheating. FIG. 7 is a diagram illustrating a flow path of water while using hot water.

As shown in FIG. 5, the water heater 100 according to the first embodiment of the present invention includes an inflow water temperature sensor 11 that measures a temperature of water that flows into an inlet 10, a flow sensor 12 that measures flow rate of the inflow water, a heat exchanger 13 that transmits the heat of a burner to the inflow water so as to send the inflow water having a user-set temperature, an outflow water temperature sensor 14 that measures a temperature of water that flows out from the heat exchanger, a water tank 15 that stores the water that flows out from the heat exchanger 13, a flow control valve 16 that controls flow rate of the outflow water, a pump 17 that is installed on a pipe 24 for connecting a first diverging point 21, which is defined by a position where the pipe 24 and an outlet pipe having an outlet 20 are connected, with a second diverging point 22, which is defined by a position where the pipe 24 and an inlet pipe having the inlet 10 are connected, a check valve 18 that prevents backflow, and a controller 30 that has an input unit 31 to allow a user to input his/her desired condition.

When the user does not use the hot water, the outlet 20 is closed, and a preheating circulation mode in which the hot water circulates in a path, which is represented by a bold line in FIG. 6, is actuated by a pressure using the pump 17.

In the preheating circulation mode, the controller 30 connected with the outflow water temperature sensor 14 compares the temperature measured by the outflow water temperature sensor 14 with a set temperature which the user inputs through the input unit 31. For example, in the case of the user-set temperature of 40° C., the controller 30 is configured to turn off heating in the heat exchanger 13 when the temperature measured by the outflow water temperature sensor 14 is higher than the user-set temperature by about 5° C., and to turn on the heating in the heat exchanger 13 when the temperature measured by the outflow water temperature sensor 14 is lower than the user-set temperature by about 5° C. Of course, it should be noted that the user-set temperature and permissible range for heating may be modified by the user.

As such, by forming a closed path of internal circulation, which connects the first diverging point 21, the pump 17, the second diverging point 22, and the heat exchanger 13, the water stored in the water tank 15 and water residing in an internal pipe of the water heater 100 are preheated even when the user does not use the hot water. Accordingly, when the user starts to use the hot water, the preheated water may, all the time, reach the temperature of the hot water which is set by the user within a short time.

Further, the hot water is always circulated through the preheating circulation mode to thereby achieve an additional effect to prevent freezing of water in the internal pipe due to a decrease of an ambient temperature during the winter season.

A time frame in which the preheating circulation is performed may be arbitrarily set by allowing the user to manipulate the input unit 31. For example, the preheating circulation may be set by the user to be 24 hours. Alternatively, the preheating circulation may be performed during a time except a sleeping time, for example, from 6 a.m. to 12 p.m.

When the user uses the hot water, as represented by a bold line in FIG. 7, the water that flows in through the inlet 10 is heated by the heat exchanger 13, discharged through the outlet 20 via the water tank 15, and supplied to the user.

When the user opens a valve installed in the outlet 20 in order to use the hot water, the hot water that reaches the first diverging point 21 is all discharged through the outlet 20 due to a pressure difference and as a result, the internal circulation is not performed any more, as shown in FIG. 6. The flow sensor 12 is installed on a pipe for connecting the inlet 10 and the heat exchanger 13, such that when a flow of the water is sensed, the sensed signal is transmitted to the controller 30, and the controller 30 controls the temperature in the heat exchanger 13 by actuating a heating device.

Hereinafter, when the user's usage of the hot water is changed, a configuration of the present invention that is capable of reducing a change in the temperature of the hot water by preventing temporary overshoot and undershoot of the hot water will be described.

When the user uses the hot water, the temperature of the inflow water is sensed by the inflow water temperature sensor 11 and the flow rate of the used hot water is determined by the flow sensor 12. By this configuration, a heating power of a burner needed for controlling the temperature of the inflow water to reach the user-set temperature of the hot water is determined, and the heating power of the burner is transmitted to the inflow water by the heat exchanger 13, such that the hot water having the user-set temperature can be discharged. Therefore, a temperature of the water that is discharged from the heat exchanger 13 and stored in the water tank 15 is the same as the user-set temperature.

When the user increases the usage of the hot water, the increase of the usage of the hot water is detected through the flow sensor 12. At this time, the controller 30 controls the temperature of the hot water to reach the user-set temperature by increasing the heating power of the burner. However, a predetermined time period is required for the controller 30 to increase the heating power of the burner in response to the detected increase of the usage of the hot water, and a large amount of water flows into the heat exchanger 13 until the predetermined time has elapsed. Even though the heating power of the burner is increased immediately, the internal heat of the heat exchanger 13 applicable for the previous small flow rate is increased gradually, whereas the flow rate of the water passing through the heat exchanger 13 increases at a faster rate, thereby causing the undershoot in which the temperature of the water that is discharged from the heat exchanger becomes temporarily lower than the user-set temperature.

However, according to the water heater 100 of the present invention, the water discharged from the heat exchanger 13 is mixed with the water stored in the water tank 15 before being supplied to the user. Since the hot water having a temperature close to the user-set temperature is always stored in the water tank 15, the water having a comparatively lower temperature that is discharged from the heat exchanger 13 is mixed with the water stored in the water tank 15 before being supplied to the user, thereby obtaining the water having the temperature substantially close to the user-set temperature.

Accordingly, since a comparatively large amount of the temporary undershoot occurring due to the increase of the usage of the hot water is absorbed in the water tank, the hot water can be supplied to the user without a remarkable change of the temperature of the hot water. Additionally, when the usage of the hot water is increased, a large amount of the overshoot which occurs by rapidly increasing the heating power of the burner in order to alleviate the undershoot may also be absorbed in the water tank.

FIG. 11 illustrates a change of the temperature of the hot water in the water heater 100 according to the present invention when the user increases the usage of the hot water. As shown in the graph of FIG. 11, the overshoot and the undershoot are remarkably decreased in comparison with the prior art water heater.

Even when the user decreases the usage of the hot water, the overshoot in which the temperature of the water discharged from the heat exchanger 13 temporarily increases occurs. However, according to the water heater of the present invention, since the water having a comparatively high temperature that is discharged from the heat exchanger is mixed with the water stored in the water tank 15, the comparatively large portion of the overshoot is absorbed in the water tank 15. Accordingly, the amount of the overshoot is remarkably decreased, such that the hot water can be supplied to the user without the remarkable change in the temperature of the hot water. Additionally, when the usage of the hot water decreases, a comparatively large amount of the undershoot which occurs by rapidly decreasing the heating power of the burner in order to prevent the overshoot can also be absorbed in the water tank.

FIG. 12 illustrates a change in the temperature of the hot water in the water heater 100 when the user decreases the usage of the hot water. As shown in the graph of FIG. 12, the overshoot and the undershoot are remarkably decreased in comparison with the known water heater.

It is preferable that a capacity of the water tank 15 is large enough to handle the increase and decrease of the user's usage of the hot water, but in the case in which the capacity of the water tank 15 increases, the entire size of the water heater also increases accordingly, so that the increase of the capacity of the water tank has a predetermined limit. The capacity of the water tank can be in the range of 2 to 3 liters.

In the present invention, the flow control valve 16 can be positioned at one side of the outlet pipe. However, the flow control valve 16 can alternatively be positioned at one side of the inlet pipe.

Hereinafter, referring to FIGS. 8 to 10, a water heater 100 according to a second embodiment of the present invention will be described.

FIG. 8 is a diagram illustrating a configuration of a water heater 100 according to the second embodiment of the present invention. FIG. 9 is a diagram illustrating a flow path of water while preheating. FIG. 10 is a diagram illustrating a flow path of water while using hot water. The same reference numerals are used to denote the same or substantially the same elements described in the first embodiment of the present invention.

As shown in FIG. 8, the water heater 100 according to the second embodiment of the present invention includes a 3-way valve 19 installed on the pipe 24 for connecting the first diverging point 21 and the second diverging point 22, in addition to the components of the water heater 100 according to the first embodiment of the present invention. Further, a third diverging point 23, formed on a pipe for connecting the first diverging point 21 and the outlet 20 and a radiator 25, is provided on an additional pipe for connecting the third diverging point 23 and the 3-way valve 19. The 3-way valve 19 is constituted by two inlets 19a and 19b and one outlet 19c to change a flow path of the water.

As shown in FIG. 9, in the case of a preheating circulation process according to the second embodiment of the present invention, when the user does not use the hot water, the first inlet 19a of the 3-way valve 19 and the outlet 20 are closed, and the second inlet 19b and the outlet 19c of the 3-way valve 19 are opened, such that the water internally circulates on the path shown in the figure.

By such a structure of the water heater 100, it is possible to prevent freezing of the pipe at a sub-zero temperature during the winter season, and heat of the preheated and circulated hot water is transmitted to the outside radiator 25 and may be used for heating.

Another aspect of the present invention is that supply of both hot water and external heat can be achieved by using only one pump 17 to circulate the water as shown in FIG. 9.

FIG. 10 illustrates a flow path of the water when the user uses the hot water. The water heater in accordance with the second embodiment of the present invention is operated in substantially the same manner as described above for the first embodiment of the present invention, shown in FIG. 7.

As described above, in the water heater 100 in accordance with the embodiments of the present invention, when the usage of the hot water is changed, a temporary change in the temperature of the hot water can be absorbed through the water tank 15 so that the hot water can be supplied without a remarkable change in the temperature of the hot water.

Further, since a temperature of the heat exchanger 13 is controlled compared to the set temperature of the hot water, a temperature at the outlet of the heat exchanger is a condensing temperature of exhaust gas or less, such that efficiency of the water heater increases, and even when the water contains some lime, a lime element is not extracted, such that it is possible to prevent durability of the heat exchanger from being decreased.

In addition, when the user does not use the hot water, the water in the water heater is circulated through the preheating circulation mode, such that it is possible to supply hot water at a level of the set temperature within a relatively short time when a user wants to use the hot water and prevent freezing of the pipe due to a decrease of an ambient temperature during the winter season.

Further, in the case of the flow path of the water during the preheating circulation process, the water passes through the outside radiator by manually or automatically operating the 3-way valve, such that the water residing in the water heater is preheated by using only one internal pump and used for the heating device.

The present invention is not limited to the embodiment, but it will be apparent to those skilled in the art that various modification and changes may be made without departing from the scopes and spirits of the present invention.

The present invention is adopted in a water supply system, such that the present invention can supply hot water without a remarkable change in a temperature of the hot water even though usage of the hot water is changed, and can be used for a heating device while preheating water residing in the water heater by using only one internal pump.

What is claimed is:

1. A hot water supply system for heating water, the system comprising:
    a heat exchanger configured to transfer heat from a heating device to an inflow water to supply an outlet water at a user-set temperature;
    a flow sensor configured to measure a flow rate of the inflow water;
    a water tank installed on an outflow side of the heat exchanger and configured to store an outflow water discharged from the heat exchanger;
    a first temperature sensor configured to measure a temperature of the inflow water, the first temperature sensor being installed at a predetermined position on an inlet pipe through which the inflow water flows;
    a second temperature sensor configured to measure a temperature of the outflow water, the second temperature sensor being installed at a predetermined position on an outlet pipe through which the outflow water flows; and a controller including an input unit configured to receive an input from a user, wherein the controller controls operation of the heating device by comparing the user set temperature with a temperature measured by the first temperature sensor and depending on variation in the flow rate measured by the flow sensor, and wherein the water discharged from the heat exchanger is mixed with the water stored in the water tank before being supplied to the user, thereby the water being supplied to the user having a temperature close to the user set temperature.

2. The hot water supply system according to claim 1, further comprising:

a pump that is installed on a first pipe connecting the inlet pipe and the outlet pipe;

a first diverging point defined by a position where the first pipe and the outlet pipe are connected; and a second diverging point defined by a position where the first pipe and the inlet pipe are connected, wherein the controller has a preheating circulation mode in which, when the user does not use a hot water, a preheated water is circulated by the pump through an internal circulation path based on a preheating circulation temperature, the internal circulation path including the first pipe, the first diverging point, the second diverging point, and the heat exchanger.

3. The hot water supply system according to claim 2, wherein the preheating circulation temperature includes a preheating circulation-on temperature and a preheating circulation-off temperature, and the controller controls the heating device to start when the temperature of the outflow water is equal to or lower than the preheating circulation-on temperature, which is lower than the user-set temperature, and to stop when the temperature of the outflow water is equal to or higher than the preheating circulation-off temperature, which is equal to or higher than the user-set temperature.

4. The hot water supply system according to claim 3, wherein the controller controls the preheating circulation mode in response to a time frame inputted by the user.

5. The hot water supply system according to claim 4, further comprising: a check valve positioned on the first pipe between the pump and the second diverging point.

6. The hot water supply system according to claim 1, further comprising:

a pump that is installed on a first pipe connecting the inlet pipe and the outlet pipe;

a first diverging point defined by a position where the first pipe and the outlet pipe are connected;

a second diverging point defined by a position where the first pipe and the inlet pipe are connected;

a second pipe connecting the first pipe and the outlet pipe;

a third diverging point defined by a position where the second pipe and the outlet pipe are connected, the third diverging point being positioned between the first diverging point and the outlet;

a 3-way valve configured to connect the first and second pipes, the 3-way valve being positioned between the first diverging point and the pump; and a radiator positioned on the second pipe, wherein the controller has a preheating circulation mode in which, when the user does not use a hot water, a preheated water is circulated by the pump through an internal circulating path based on a preheating circulation temperature, the internal circulation path including the first diverging point, the second diverging point, the third diverging point, the second pipe, the exchanger, and the 3-way valve.

7. The hot water supply system according to claim 6, wherein the preheating circulation temperature includes a preheating circulation-on temperature and a preheating circulation-off temperature, and the controller controls the heating device to start when the temperature of the outflow water is lower than the preheating circulation-on temperature, which is equal to or lower than the user-set temperature, and to stop when the temperature of the outflow water is equal to or higher than the preheating circulation-off temperature, which is equal to or higher than the user-set temperature.

8. The hot water supply system according to claim 7, wherein the controller controls the preheating circulation mode in response to a time frame inputted by the user.

9. The hot water supply system according to claim 8, further comprising:

a check valve positioned on the first pipe between the pump and the second diverging point.

10. A hot water supply system having a preheating circulation mode to preheat a water, the system comprising:

a first diverging point defined by a position where a pipe and an outlet pipe are connected;

a second diverging point defined by a position where the pipe and an inlet pipe are connected;

a pump positioned on the pipe between the first diverging point and the second diverging point;

a heat exchanger configured to transfer heat from a heating device to an inflow water to supply an outlet water at a user-set temperature;

a flow sensor configured to measure a flow rate of the inflow water;

a temperature sensor configured to measure a temperature of the inflow water, the temperature sensor being installed at a predetermined position on an inlet pipe through which the inflow water flows;

a water tank installed on an outflow side of the heat exchanger and configured to store an outflow water discharged from the heat exchanger; and a controller including an input unit configured to receive an input from a user;

wherein the controller controls operation of the heating device by comparing the user set temperature with a temperature measured by the temperature sensor and depending on variation in the flow rate measured by the flow sensor, wherein the water discharged from the heat exchanger is mixed with the water stored in the water tank before being supplied to the user, thereby the water being supplied to the user having a temperature close to the user set temperature, and wherein, when a user does not use a hot water, the outlet pipe is closed and the preheating circulation mode is performed in which the hot water circulates in an internal circulation path by a pressure of the pump, the internal circulation path including the pipe, the first diverging point, the second diverging point and the heat exchanger.

11. The hot water supply system according to claim 10, further comprising:

a water tank configured to store an outflow water discharged from the heat exchanger.

12. The hot water supply system according to claim 10, wherein the heating device is controlled to start when a temperature of an outflow water discharged from the heat exchanger is lower than a preheating circulation-on temperature, which is equal to or lower than the user-set temperature, and to stop when the temperature of the outflow water discharged from the heat exchanger is equal to or higher than a preheating circulation-off temperature, which is equal to or higher than the user-set temperature.

13. A hot water supply system for heating a water, the system comprising:
- a heat exchanger configured to transfer heat from a heating device to an inflow water to supply an outlet water at a user-set temperature;
- a flow sensor configured to measure a flow rate of the inflow water;
- a water tank installed on an outflow side of the heat exchanger and configured to store an outflow water discharged from the heat exchanger;
- a first temperature sensor configured to measure a temperature of the inflow water, the first temperature sensor being installed at a predetermined position on an inlet pipe through which the inflow water flows;
- a second temperature sensor configured to measure a temperature of the outflow water, the second temperature sensor being installed at a predetermined position on an outlet pipe through which the outflow water flows;
- a controller including an input unit configured to receive an input from a user,
- a pump that is installed on a first pipe connecting the inlet pipe and the outlet pipe;
- a first diverging point defined by a position where the first pipe and the outlet pipe are connected;
- a second diverging point defined by a position where the first pipe and the inlet pipe are connected;
- a second pipe connecting the first pipe and the outlet pipe;
- a third diverging point defined by a position where the second pipe and the outlet pipe are connected, the third diverging point being positioned between the second diverging point and the outlet;
- a 3-way valve configured to connect the first and second pipes, the 3-way valve being positioned between the first diverging point and the pump;
- a radiator positioned on the second pipe; and
- a check valve positioned on the first pipe between the pump and the second diverging point,
- wherein the controller controls operation of the heating device by comparing the user set temperature with a temperature measured by the first temperature sensor and depending on variation in the flow rate measured by the flow sensor,
- wherein the water discharged from the heat exchanger is mixed with the water stored in the water tank before being supplied to the user, thereby the water being supplied to the user having a temperature close to the user set temperature,
- wherein the controller has a preheating circulation mode in which a preheated water is circulated by the pump through an internal circulating path based on a preheating circulation temperature, the internal circulation path including the first diverging point, the second diverging point, the third diverging point, the second pipe, the exchanger, and the 3-way valve,
- wherein the preheating circulation temperature includes a preheating circulation-on temperature and a preheating circulation-off temperature, and the controller controls the heating device to start when the temperature of the outflow water is lower than the preheating circulation-on temperature, which is equal to or lower than the user-set temperature, and to stop when the temperature of the outflow water is equal to or higher than the preheating circulation-off temperature, which is equal to or higher than the user-set temperature, and
- wherein the controller controls the preheating circulation mode in response to a time frame inputted by the user.

* * * * *